United States Patent [19]

Russell

[11] Patent Number: 4,696,596
[45] Date of Patent: Sep. 29, 1987

[54] EQUIPMENT MOUNTING MECHANISM

[75] Inventor: Lionel V. F. Russell, Suffolk, United Kingdom

[73] Assignee: W. Vinten Limited, England

[21] Appl. No.: 744,972

[22] Filed: Jun. 17, 1985

[30] Foreign Application Priority Data

Jun. 16, 1984 [GB] United Kingdom ............... 8415417

[51] Int. Cl.⁴ .................... F41G 1/38; F16M 11/04; F16B 21/00
[52] U.S. Cl. .................... 403/321; 403/327; 403/380; 403/13; 248/178; 248/187; 33/250; 33/248; 42/101
[58] Field of Search .............. 248/178, 184, 187; 403/321, 380, 335, 338, 327, 325, 13, 14; 33/248, 249, 250; 42/101

[56] References Cited

U.S. PATENT DOCUMENTS

| | | | |
|---|---|---|---|
| 943,063 | 12/1909 | Cooke | 248/178 |
| 1,629,579 | 5/1927 | Langley | 248/178 |
| 2,500,379 | 3/1950 | Robinson | 248/178 |
| 3,549,113 | 12/1970 | Pagliuso | 248/187 |
| 3,628,761 | 12/1971 | Thomas, Jr. | 248/184 |
| 3,931,947 | 1/1976 | Tagnon | 248/180 |
| 3,974,994 | 8/1976 | Petterson | 248/181 |
| 4,085,915 | 4/1978 | Song et al. | 248/187 |
| 4,290,574 | 9/1981 | Archibald | 33/299 X |
| 4,409,738 | 10/1983 | Renander et al. | 33/248 X |
| 4,525,052 | 6/1985 | Kosugi et al. | 248/187 |

FOREIGN PATENT DOCUMENTS 0051574 5/1982 European Pat. Off. ............ 248/178

Primary Examiner—Cornelius J. Husar
Assistant Examiner—Todd G. Williams
Attorney, Agent, or Firm—Larson and Taylor

[57] ABSTRACT

An interface mechanism for the mounting of one component to another, especially useful where the components have to be boresighted and where the boresighted components have to be removed and replaced without disturbing the accuracy of the boresighting. Locking means are provided to retain the two sections of the interface in a rigid state when mated.

10 Claims, 7 Drawing Figures

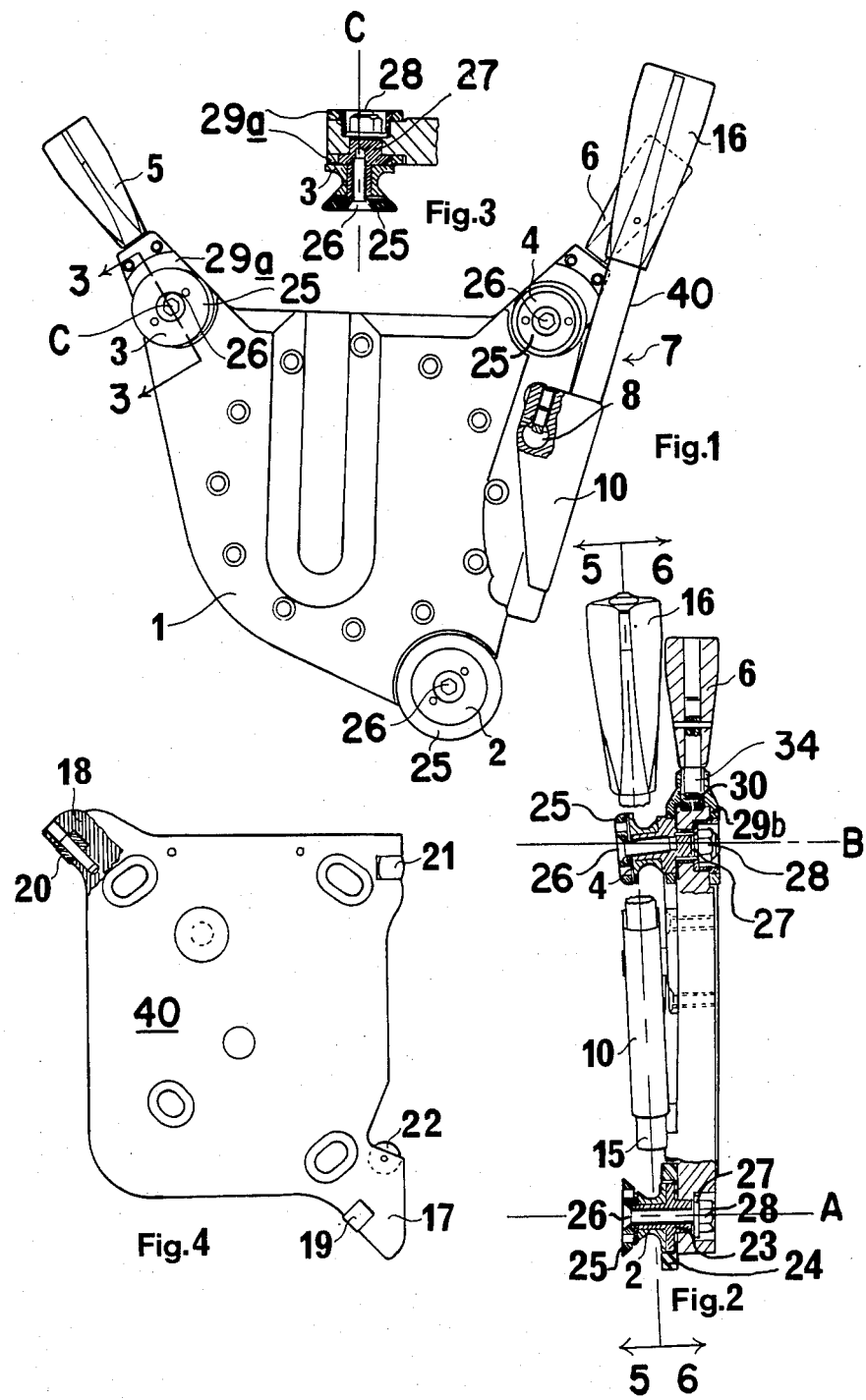

EQUIPMENT MOUNTING MECHANISM

FIELD OF THE INVENTION

This invention relates to Equipment Mounting or Interface Mechanisms and more particularly, though not exclusively, to vertical interface mechanisms and more especially to interface mechanisms wherein the female section is mounted on a movable object and the male section is mounted on such as a payload required to be rigidly attached to the movable object in such a manner as to be alignable, removable and replaceable, without realignment, to a high degree of accuracy.

BACKGROUND OF THE INVENTION

An example of such a mechanism may be that for mounting a side mounted gun sight to a gun wherein the gun and sight are aligned, i.e. boresighted, for a specific distance at which a line drawn longitudinally through the gun barrel intersects a line drawn longitudinally through the gun sight at that distance. Previous methods of coupling the two interfacing sections have required, at least to some degree, realignment. Which, to say the least, is unacceptable in many circumstances.

SUMMARY OF THE INVENTION

It is therefore an object of this invention to provide an equipment mounting or interface mechanism wherein once the two sections have been boresighted the gunsight, for example, may be removed and replaced at will, without disturbing the accuracy of the boresighting.

According to the invention we provide an interface mechanism comprising a female section having lockable adjusting means for alignment of a mating male section and locking detachment means for retention/removal of the mating male section in its aligned position.

BRIEF DESCRIPTION OF THE DRAWINGS

The invention will now be described, by way of example only, in conjunction with the accompanying drawings in which, FIG. 1 shows a front elevation of the female section FIG. 2 shows a side elevation of the female section FIG. 3 shows a view through a roller of FIG. 1 taken along line 3—3 of FIG. 1

FIG. 4 shows a front elevation of the mating face of the male section

DETAILED DESCRIPTION OF THE PREFERRED EMBODIMENTS

Figure 5:
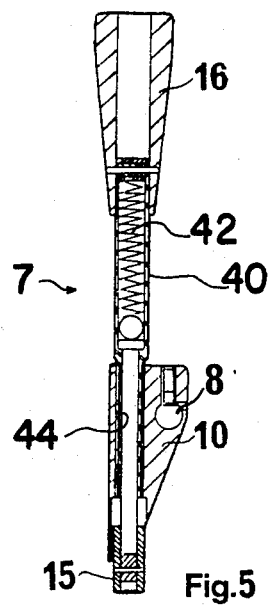
FIG. 5 shows a cross section through one type of locking detachment means taken through the plane of the line 5—5 of FIG. 2

Referring now to FIG. 1 a plate (1) or female section suitably drilled and/or machined for attachment to such as a gun, theodolite or any other equipment having movement in elevation and/or possibly azimuth has three spaced apart rollers (2), (3) and (4) pivotally mounted thereon and each roller has, circumferentially, a substantially Vee groove. Roller (2) is mounted on a pivot fixed to the plate (1) in such a manner that the roller may rotate on the pivot but not become detached therefrom. Roller (3), more clearly shown on FIG. 3, is mounted on an eccentric pivot in a rotatable block (29) which is rotatable and lockably releasable using threaded handle (5) so that the plane of the substantially Vee groove of the roller may be moved towards or away from a point on the plane along a line drawn parallel to the plates mating face. Roller (4) is mounted on an angled pivot in rotatable block (29), more clearly shown on FIG. 2, which is rotatable and lockably releasable using threaded handle (6) so that the angle subtended by the plane of the smallest circumference of the substantially Vee groove and the mating face of the female section may be varied.

Figure 6:
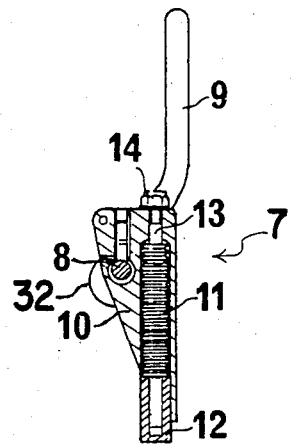
FIG. 6 shows a cross section through a preferred type of locking detachment means which is oriented as it would appear if viewed along line 6—6 of FIG. 2, if it were in place in FIG. 2 instead of the embodiment of FIG. 5.

A locking means 7, the preferred type of which is shown on FIG. 6 and an alternative type on FIG. 5 is, in the preferred type a block (10) eccentrically pivoted at point (8) to cam 32 which is in turn pivotally connected to plate (1) and releasably lockable by actuation of lever (9) which is preferably a sideways extension of the cranked section of the eccentric pivot such that clockwise rotation of element (9) (as viewed in FIG. 6) moves the pivot point (8) and hence the block (10) down and to the left, thereby moving the plunger (12) into alignment and against the roller (22). Counterclockwise rotation of lever (9) to the release position depicted moves the block (10) away from the locked position and releases the compression on spring (11) with pivot point (8) at the top of cam (32), as shown, thereby releases the pressure of plunger (12) on roller (22). To retain plunger (12) within the block (10) a threaded extention (13) connected to and slidable within plunger (12) extends longitudinally through spring (11) and a suitable exit in block (10) and may be secured with a retaining means such as a nut (14). Preferably the external end of plunger (12) is concave to provide a better mating surface on such as a ballbearing or curved wheel (22) which forms the locking point of a male section of the interface.

The alternative locking means shown in FIG. 5 is mounted on the female section using a straight pivot (8) such that clockwise rotation of locking means (7) about the axis of pivot point (8) (as view in FIG. 7) brings the plunger (15), loaded by spring (40), into alignment with wheel (22), after which the spring loaded plunger (15) is moved into the locking position by rotation of knob (16) which screws the extension (42) of handle (16) into the block (10) via threaded engagement (44). Opposite threaded rotation of knob (16) releases the plunger (15) from the locked position after which the turning of knob (16) in the counterclockwise direction (as viewed in FIG. 7) moves the plunger (15) out of alignment with the roller (22).

Referring now to FIG. 4 a shaped plate (40) suitably drilled and/or machined for attachment to a payload forms the male section (40) of the interface mechanism. The plate, basically square with protrusions (17) and (18) at two diagonally opposite corners, has pivoted rollers (19) and (20) of suitable diameter and length to provide two point contact on each of their mating Vee grooved rollers on the respective rollers (2) and (3) of the female section of the interface machanism. A third roller (21) pivotally mounted in the plate, adjacent an intermediate corner, is also of suitable diameter and length to provide two point contact on its mating Vee grooved roller (4) on the female section. A pivoted curved wheel (22) mounted in the opposite edge of protrusion (17) to roller (19) forms the male lock for the male section (40). A ball bearing, as aforestated, may be used in preference to the wheel, but preferably at least all mating surfaces on the rollers both on the female and male sections and the surface of the curved wheel (22) should be hardened so that only point contacts between the two sections are maintained. It is also preferably that all contact points between the two sections when mated should be rolling contacts to provide a high degree of accuracy when remating the two sections after separation from a previous alignment or boresighting. Fixed rollers may be used if efficiency can be forfeited.

Referring again to FIG. 2, roller (2) is mounted on a stub axle (23) which sits in a sleeve (24). Axle (23), mounted along axis A and sleeve (24) are retained in position on plate (1) by a shaped washer (25), screw (26), washer (27) and nut (28), as shown. Rollers (3) and (4) are substantially similarly mounted, but with the differences discussed below.

Roller (4) is mounted as follows: elements (25), (26), (27) and (28) are essentially the same as shown and described for roller (2); but elements (23) and (24) of FIG. 2 are replaced by the angled block (29b). On the end of handle (6) is a pad (30). This pad (30) abuts the edge of plate (1) when threaded handle (6) is screwed inwards via threaded engagement (34) between handle (6) and block (29b). When handle (6) is unscrewed (moved outwardly), handle (6) and block (29b) are rotatable together with roller (4) about axis B.

Figure 7:
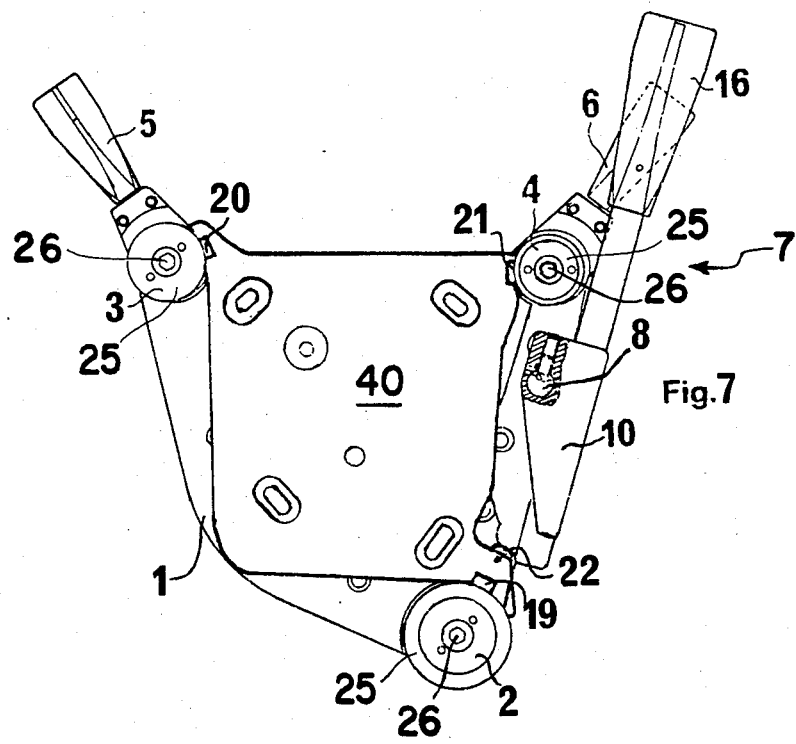
FIG. 7 shows coupled male and female sections, not locked together.

Roller (3) is mounted on handle (5) in a manner similar to roller (2) except for the eccentricity of this mounting on block (29a). As shown in FIG. 3, elements (25), (26), (27) and (28) are essentially the same as with respect to roller (2); and the elements (23) and (24) are replaced by eccentric block (29a). Thus, when handle (5) is unscrewed (by a structure which is not shown but which is similar to the structure shown in FIG. 2 for unscrewing of handle (6) via threads (34) on block (29b) of roller (4)), handle (5) can be rotated together with the block (29a) about axis C to cause roller (3) to move toward or away from the center of the plate (1). With male section (40) in place, this exerts a corresponding holding force on roller (20) of male section (40), as shown in FIG. 7, and handle (5) is then screwed down to hold the male section (40) in this position. As is apparent from the Figures, axes A, B and C are parallel to each other and perpendicular to the plane of plate (1).

As discussed above, roller (4) is rotatably moved by handle (6). However, due to the angle of mounting of roller (4) relative to axis A, the Vee groove moves toward or away from plate (1) relative to an adjacent fixed point on plate (1). Thus, with reference to FIG. 7, it can be appreciated that rotation of roller (4) causes roller (21) of male section (40) to be moved toward or away from plate (1). When male section (40) is in the desired position, handle (6) is screwed down to hold male section (40) in this position.

When male section (40) held in a desired place by rollers (2), (3) and (4), it can be appreciated with reference to FIG. 7 that male section (40) is upwardly movable (as depicted) with respect to these rollers. In order to hold male section (40) vertically in place, handle 16 is moved to bring plunger (15) into contact with wheel (22). Once plunger (15) is in place, male section (40) is securely held to male section (1). However, if it is desired to remove male section (40), plunger (15) is simply backed off to allow clearance for wheel (22) and male section (40) is vertically removed. The accurate replacement of male section (40) is then easily accomplished in an opposite procedure.

It will be obvious to those skilled in the art that various improvements or additions may be made, such as providing guide means to assist mating of the two sections, without departing from the spirit of the invention as disclosed in this specification.

It will also be obvious that the male and female rollers may be interchanged and various locking means may be used for locking the adjustable rollers.

I claim:

1. An equipment mounting mechanism for removably mounting a component to an object comprising:
   a female section attached to one of the component and object;
   a male section attached to the other of the component and object;
   a holding means on said female section for adjustably holding said male section to said female section, said holding means including;
   (a) first, second, and third engagement means which form a plane and between which said male section is located for immovably engaging said male section in two of three mutually perpendicular axes and for allowing free movement of said male section along the third mutually perpendicular axis which third axis is in the plane,
   (b) a first mounting means for fixedly mounting said first engagement means to said female section,
   (c) a second mounting means for adjustably and lockably mounting said second engagement means in the direction of the third axis,
   (d) a third mounting means for adjustably and lockably mounting said third engagement means is a direction perpendicular to the plane, and
   (e) a locking means for releasably locking said male section against movement along the third axis after a desired alignment with said second and third mounting means whereby said male section is removable from said female section along the third axis by release from said locking means and returnable to the desired alignment by reinsertion along the third axis and locking in place with said locking means.

2. An equipment mounting mechanism as claimed in claim 1 wherein all of said engagement means each comprise a roller having approximately parallel axes of rotation.

3. An equipment mounting mechanism as claimed in claim 2 wherein the axes of rotation are approximately perpendicular to the plane.

4. An equipment mounting mechanism as claimed in claim 3 wherein said second mounting means includes an eccentric mounting for the axis of rotation of the roller of said second engagement means.

5. An equipment mounting mechanism as claimed in claim 3 wherein the axis of rotation of said third mounting means is at an acute angle to the plane, and wherein said third mounting means includes a means for rotating said third roller about an axis perpendicular to the plane.

6. An equipment mounting mechanism as claimed in claim 1 wherein each of said rollers has a circumferential Vee groove for reception of said mating male section.

7. An equipment mounting mechanism as claimed in claim 6 wherein at least the Vee grooves of said rollers are hardened material.

8. An equipment mounting mechanism as claimed in claim 1 wherein said male section comprises a shaped plate having at least three respective hardened rollers each mateable with a respective one of said rollers of said female section, and a further hardened roller which is mateable with said locking means of said female section.

9. An equipment mounting mechanism as claimed in claim 8 wherein said locking means comprises a pivoted eccentric having an actuating lever which when operated moves a block containing a spring operated plunger into contact with said further hardened roller to apply pressure on said further hardened roller and maintain alignment of said male section with said female section.

10. An equipment mounting mechanism as claimed in claim 8 wherein said locking means comprises a pivoted plunger with a spring loaded end operably adjusted to apply pressure on said further hardened roller to maintain alignment of said male section with said female section.

* * * * *